3,598,797
PROCESS FOR MANUFACTURING
POLYVINYLIDENE FLUORIDE
Yutaka Kometani, Nishinomiya-shi, Masahiro Okuda, Amagasaki-shi, Chuzo Okuno, Osaka-shi, Japan, assignors to Daikin Kogyo Co., Ltd., Osaka-shi, Japan
No Drawing. Filed June 20, 1968, Ser. No. 738,391
Claims priority, application Japan, June 27, 1967, 42/41,124
Int. Cl. C08f 3/22
U.S. Cl. 260—92.1                        3 Claims

ABSTRACT OF THE DISCLOSURE

A process for manufacturing polyvinylidene fluoride by polymerization of vinylidene fluoride in the presence of tertiary butyl peroxyisobutyrate as a catalyst. The polymerization reaction of the present invention proceeds with a higher polymerization velocity under a lower polymerization pressure than those polymerizations hitherto known. It is also characterized in the fact that the polyvinylidene fluoride obtained by the present process is superior in its properties to that hitherto produced.

---

This invention relates to a process for manufacturing polyvinylidene fluoride. More particularly, it relates to a process for manufacturing polyvinylidene fluoride by polymerization of vinylidene fluoride in the presence of tertiary butyl peroxyisobutyrate as a catalyst.

The chemical structure of tertiary butyl peroxyisobutyrate may be illustrated as follows:

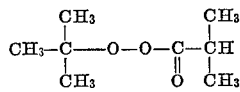

The process of the present invention is particularly advantageous in that the polymerization reaction proceeds with a higher polymerization velocity under a lower polymerization pressure than those polymerizations hitherto known and that the polyvinylidene fluoride obtained is superior in its properties to that produced by the methods hitherto known.

The polymerization reaction of vinylidene fluoride has been investigated from various viewpoints. Particularly, a variety of radical initiators have been examined as a polymerization catalyst. Among them, a catalyst composition consisting of a persulfate (e.g. potassium persulfate, ammonium persulfate), sodium hydrogen sulfite and ferrous sulfate is known to be excellent in that a high polymerization degree and a high polymerization velocity can be achieved. But, the polyvinylidene fluoride produced by this catalyst composition is disadvtantageously colored with foaming on heat treatment which is necessitated for molding. Further, the polymer disadvantageously had a high melt viscosity so that the molding encounters difficulty and also is sparingly soluble in various, ordinary solvents. On the other hand, although the use of an organic peracid anhydride as a catalyst overcomes such defects in properties of the product, the polymerization reaction requires a high polymerization pressure (e.g. 700 kg./cm.$^2$ (G)) and the reaction yield is generally poor. In any case, the industrial disadvantages are unavoidable.

It has now been discovered that tertiary butyl peroxyisobutyrate can induce the polymerization of vinylidene fluoride with a high polymerization velocity even under a low polymerization pressure. It has also been discovered that the thus produced polyvinylidene fluoride has no such defects as described above, especially on heat treatment. The present invention has been accomplished on the bases of these discoveries.

A fundamental object of the present invention is to embody a process for manufacturing polyvinylidene fluoride. Another object of the invention is to embody a process for manufacturing polyvinylidene fluoride with a high polymerization velocity. Another object of the invention is to embody a process for manufacturing polyvinylidene fluoride under a low polymerization pressure. A further object of the invention is to embody a process for manufacturing polyvinylidene fluoride with neither coloring nor foaming on heating. A still further object of the invention is to embody the use of tertiary butyl peroxyisobutyrate as a catalyst for polymerization of vinylidene fluoride. These and other objects of the present invention will be apparent to those conversant with the art to which the present invention concerns from the following descriptions.

According to the present invention, the polymerization of vinylidene fluoride to polyvinylidene fluoride is carried out in the presence of tertiary butyl peroxyisobutyrate as a catalyst. Although the polymerization of the present invention can be executed in any form of suspension polymerization, emulsion polymerization and solution polymerization, suspension or emulsion polymerization in an aqueous medium is generally preferred from the industrial and economical viewpoints, because the recoveries of the resulted polymer and the unreacted monomer can be easily achieved, the cost of the reaction solvent can be economized and the polymerization can be performed smoothly.

The polymerization recation of the present invention is carried out at 60 to 150° C., preferably at 70 to 120° C. Below 60° C., the polymerization velocity is lowered and the yield is decreased. On the contrary, the polymerization degree is reduced at a temperature higher than 150° C. Although the polymerization pressure is not substantially required to be limited, the reaction under a high pressure is apparently disadvantageous, particularly from the industrial viewpoint. Accordingly, the process of the present invention is carried out under 0 to 200 kg./cm.$^2$ (G), preferably under 10 to 100 kg./cm.$^2$ (G). A suitable ratio of the catalyst is 0.001 to 5% (weight per volume of monomer), most favorably 0.01 to 2%.

When the polymerization is carried out in an aqueous medium, there may be supplied a surfactant. Examples of the surfactant include perfluorocarboxylic acids and their salts of the formula:

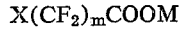

wherein X is a hydrogen atom, a chlorine atom or a fluorine atom, M is a hydrogen atom, and alkali metal atom (e.g. sodium, potassium) or an ammonium group and $m$ is an integer from 6 to 12, perchlorofluorocarboxylic acids and their salts of the formula:

wherein $n$ is an integer from 3 to 6 and X and M are each as defined above, and the like. Specifically, there may be preferably employed perfluorooctanoic acid of the formula: F(CF$_2$)$_7$COOH or its alkali metal or ammonium salt, ω-hydroxyperfluoroheptanoic acid of the formula: H(CF$_2$)$_6$COOH or its alkali metal or ammonium salt, or the like. Further, there may be also added a water-immiscible organic solvent such as 1,1,2-trichlorotrifluoroethane or 1,2-dichlorofluoroethane as a dispersion medium or a stabilizer of the polymerization system. As the stabilizer of the polymerization system, a hydrophilic organic solvent such as methanol or butanol may also be favorably added to the reaction mixture.

The process of the present invention is, as described before, characterized particularly in (1) a high polymerization velocity, (2) a high polymerization degree, (3) a low polymerization pressure and (4) excellent properties of the resulted polymer (no thermal deterioration, e.g. coloring, foaming). Even when compared with a process using di-tertiary butyl peroxide which is one of the best catalysts for the polymerization of vinylidene fluoride, the process of the present invention is almost equivalent in the polymerization velocity, the polymerization pressure and the yield, and superior at least in the following two points: (1) the process of the present invention can be performed at a lower temperature and (2) the polyvinylidene fluoride produced by the present invention is to readily soluble in a solvent such as dimethylacetamide as to be suited to the precise moldings such as coating materials or film bases.

Practical embodiments of the present invention will be illustrated in the following examples. It should be understood that they are presented for the purpose of illustration only and not of limitation. The abbreviations used have conventional significances unless otherwise noted.

EXAMPLE 1

In a 3.0 l.-reaction vessel of stainless steel being tolerable up to 100 kg./cm.$^2$ (G) and equipped with a mechanical stirrer and a water bath are placed deoxygenated water (purified with ion-exchange resins) (2.5 l.), tertiary butyl peroxyisobutyrate (1.0 g.) and ammonium perfluorooctanoate (25 g.). The air in the reaction vessel is replaced by vinylidene fluoride, and vinylidene fluoride is then compressed into the vessel so as to make the inner pressure 40 kg./cm.$^2$ (G). Stirring is started and the temperatuer is elevated to 75° C. so that the inner pressure is increased to 80 kg./cm.$^2$ (G). After about 10 minutes, the polymerization is initiated and the introduction of vinylidene fluoride is continued to keep the pressure at 75 to 80 kg./cm.$^2$ (G) during 4.5 hours. After cooling, unreacted gaseous monomer is discharged. The precipitates are collected, washed with water and methanol and dried to give polyvinylidene fluoride (236 g.) as white powder.

EXAMPLE 2

In the same reaction vessel as of Example 1 are placed deoxygenated water (purified with ion-exchange resins) (2.5 l.), tertiary butyl peroxyisobutyrate (0.1 g.) and ammonium perfluorooctanoate (7.5 g.), and the polymerization of vinylidene fluoride is carried out at 90° C. under 40 to 42 kg./cm.$^2$ (G) for 3.5 hours to give polyvinylidene fluoride (50 g.) as white powder.

Examples 3 to 16 are summarized in the following table where the polymerization procedures are performed in the similar manner to Example 1.

TABLE

| Example No. | Catalyst (g.) | Solvent [1] (kg.) | Surfactant [2] (g.) | Temperature (° C.) | Pressure (kg./cm.$^2$ (G)) | Time (min.) | Yield (g.) | Polymerization [3] velocity (g./L/sec.) | Efflux [4] velocity (cm.$^3$/sec.) [1] |
|---|---|---|---|---|---|---|---|---|---|
| 3 | 5.0 | 2.0 | 20 | 80–83 | 75–83 | 153 | 222 | 1.89×10$^{-4}$ | >3×10$^{-2}$ |
| 4 | 3.0 | 2.5 | 25 | 72–80 | 75–80 | 330 | 268 | 0.85×10$^{-4}$ | 2.1×10$^{-2}$ |
| 5 | 1.0 | 2.5 | 25 | 68–77 | 73–85 | 240 | 270 | 1.16×10$^{-4}$ | 2.6×10$^{-3}$ |
| 6 | 1.0 | 2.5 | 25 | 75 | 40–45 | 1,035 | 143 | 1.44×10$^{-5}$ | 3.2×10$^{-3}$ |
| 7 | 0.5 | 2.5 | 25 | 75 | 40–45 | 750 | 131 | 1.82×10$^{-5}$ | 1.0×10$^{-3}$ |
| 8 | 0.2 | 2.5 | 25 | 75 | 37–44 | 1,140 | 22 | 0.20×10$^{-5}$ | 2.7×10$^{-3}$ |
| 9 | 0.5 | 2.5 | 25 | 75 | 40–42 | 390 | 25 | 0.64×10$^{-5}$ | >3×10$^{-1}$ |
| 10 | 0.5 | 2.5 | 7.5 | 75 | 40–42 | 420 | 58 | 1.44×10$^{-5}$ | 8.5×10$^{-3}$ |
| 11 | 0.3 | 2.5 | 7.5 | 80 | 40–42 | 300 | 44 | 1.53×10$^{-5}$ | 2.7×10$^{-3}$ |
| 12 | 0.1 | 2.5 | 7.5 | 90 | 40–42 | 210 | 53 | 2.64×10$^{-5}$ | 7.8×10$^{-4}$ |
| 13 | 0.5 | 2.5 | 15 | 75 | 40–42 | 300 | 45 | 1.1×10$^{-5}$ | 2.9×10$^{-3}$ |
| 14 | 0.3 | 2.5 | 7.5 | 80 | 40–42 | 300 | 45 | 1.5×10$^{-5}$ | 1.7×10$^{-3}$ |
| 15 | 0.8 | 2.0 | 1.2 | 100 | 40–42 | 190 | 108 | 0.74×10$^{-4}$ | 2.0×10$^{-1}$ |
| 16 | 0.3 | 2.5 | 1.5 | 90 | 30–32 | 260 | 31 | 0.31×10$^{-4}$ | 4.8×10$^{-3}$ |

[1] Water.
[2] Ammonium perfluorooctanoate.
[3] Weight of polymer/volume of water/sec.
[4] Efflux veolcity when effluxed from a nozzle of 1 mm. in length and 1 mm. in diameter at 220° C. with a pressure of 35 kg./cm.$^2$

What is claimed is:
1. A process for manufacturing polyvinylidene fluoride which comprses substantially polymerizing vinylidene fluoride in the presence of tertiary butyl peroxyisobutyrate at a temperature of 60 to 150° C. under a pressure of 0 to 200 kg./cm.$^2$ (G), the ratio of said tertiary butyl peroxyisobutyrate to be used being 0.001 to 5.0% by weight per volume of monomer.

2. The process according to claim 1, wherein the polymerization is carried out substantially in an aqueous medium.

3. The process according to claim 1 wherein the polymerization is carried out at a temperature of 60 to 150° C. and a perfluoroalkanoate is added to the reaction medium as a surfactant.

References Cited

UNITED STATES PATENTS 3,031,437  4/1962  Iserson _____ 260—92.1
3,446,831  5/1969  Mageli et al. _____ 260—85.5F

OTHER REFERENCES

Mageli, Industrial and Engineering Chemistry, 58, No. 3, March 1966, pp. 25–31.

HARRY WONG, JR., Primary Examiner

U.S. Cl. X.R.

260—32.6